United States Patent [19]

Hancock

[11] 4,403,737
[45] Sep. 13, 1983

[54] WATER-HOSE-POWERED GARDEN/AGRICULTURAL SPRAYERS AND SPECIAL NOZZLE

[76] Inventor: Homer H. Hancock, 4025 State St., Space 59, Santa Barbara, Calif. 93110

[21] Appl. No.: 214,480

[22] Filed: Dec. 8, 1980

[51] Int. Cl.³ .............................................. B05B 7/30
[52] U.S. Cl. .................................. 239/154; 239/318; 239/375
[58] Field of Search ................ 222/133, 134; 239/152, 239/154, 310, 316, 317, 318, 345, 375, 376, 377, 379, 403, 587

[56] References Cited

U.S. PATENT DOCUMENTS

| | | | |
|---|---|---|---|
| 2,052,362 | 8/1936 | Roselund | 239/587 X |
| 2,264,539 | 12/1941 | Lindstaedt | 239/310 X |
| 2,553,379 | 5/1951 | Peterlin | 239/310 X |
| 2,788,245 | 4/1957 | Gilmour | 239/318 X |
| 3,801,018 | 4/1974 | Plotz | 239/316 |

FOREIGN PATENT DOCUMENTS

| | | | |
|---|---|---|---|
| 513786 | 2/1955 | Italy | 239/376 |
| 509182 | 7/1930 | United Kingdom | 239/318 |

*Primary Examiner*—Andres Kashnikow

[57] ABSTRACT

An improved garden/agricultural sprayer nozzle having a short mixing chamber in front of a conventional fog-mist nozzle for the purpose of mixing a gravity-fed strong solution with plain water-fog-mist to create a finished spray mixture as it leaves the nozzle hole area. The plain water fog-mist is produced by ordinary hose-water pressure through a regular swirl-type diaphragm nozzle. Mixture with the strong solution takes place in the short mixing chamber as the plain fog mist emerges from the sprayer nozzle where it comes in contact with the strong solution flowing around the nozzle hole. The flow of strong solution is facilitated by a shallow depression or groove in bottom of the short mixing chamber close to and encircling the nozzle hole. The strong solution is gravity fed through a series of nipples and hose from a tilting fruit jar on a parallel arm of a contraption supporting the nozzle assembly and the solution jar.

1 Claim, 7 Drawing Figures

U.S. Patent   Sep. 13, 1983   4,403,737
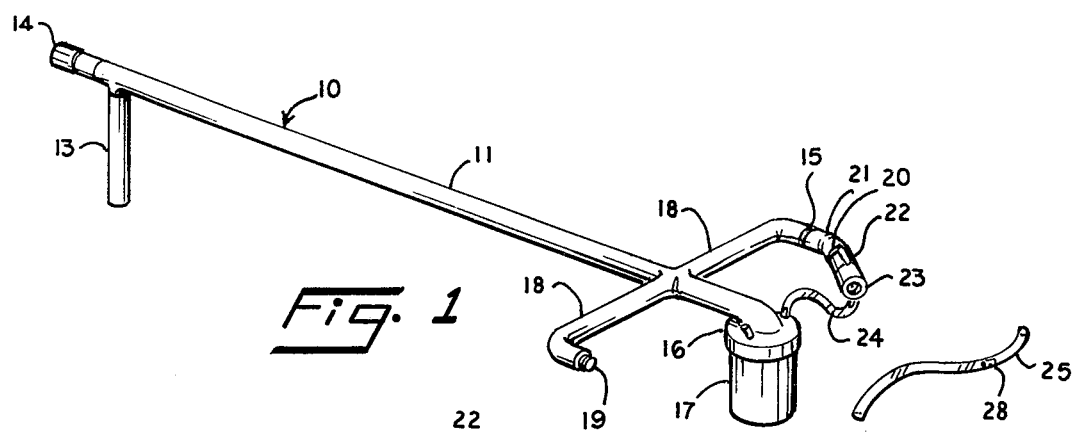
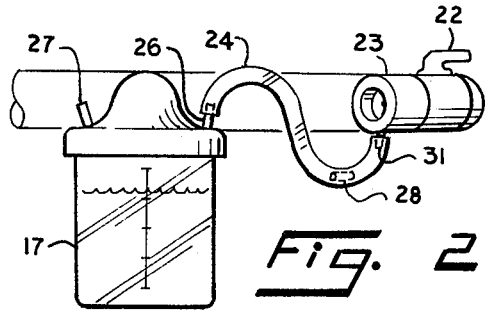
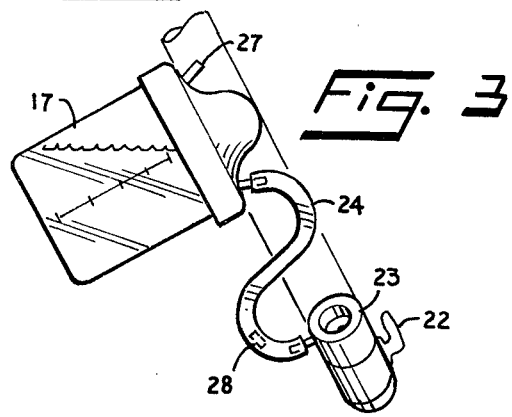
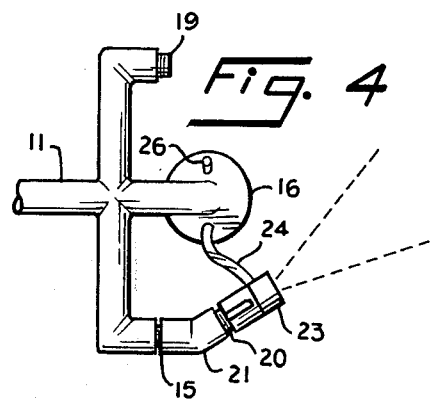
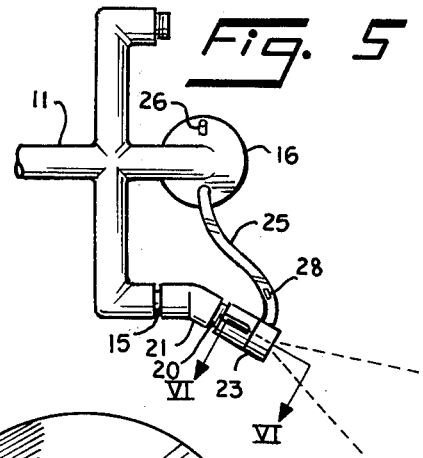
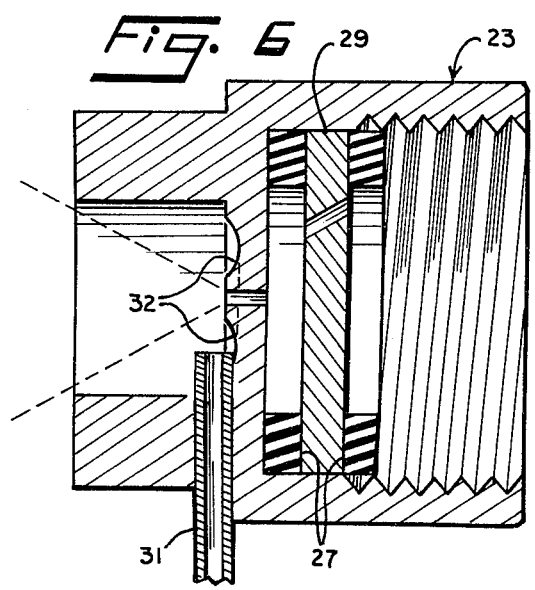
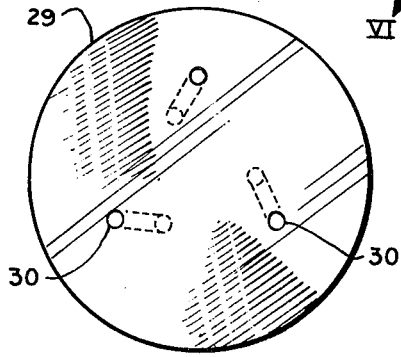

WATER-HOSE-POWERED GARDEN/AGRICULTURAL SPRAYERS AND SPECIAL NOZZLE

BACKGROUND OF THE INVENTION

The following patents disclose spraying devices wherein a chemical is mixed with water prior to being discharged from nozzle:

| Number | Name | Date |
| --- | --- | --- |
| 1,848,708 | Gatchet | 3/1932 |
| 2,553,379 | Peterlin | 5/1951 |
| 2,264,539 | Lindstaedt | 12/1941 |
| 3,801,018 | Plotz | 4/1974 |
| 2,788,245 | Gilmour | 4/1957 |

Please note first of all that my invention is specifically and very briefly described in the title: "Graviti-Fed-Fog Sprayer." The fog mist is produced by a conventional type spray nozzle, using plain water that is swirled between a diaphragm and the nozzle hole. As the water emerges from the nozzle in the inside of the mixing chamber, it is fed a strong solution, as will be explained in following sections of this application and will be illustrated by drawings. None of the above cited examples appear to have the widely used conventional type nozzle that is commonly and commercially used for agricultural spraying. My invention calls for the use of this type of nozzle producing a good fog mist. The simple novelty of feeding the mist into an open-ended mixing chamber as it emerges from the nozzle hole on its way to the object being sprayed is the main feature of my improved nozzle for spraying. Gatchet, Lindstaedt and Gilmour have deflector type spreaders, and Peterlin appears to have a squeeze-type nozzle to spray or spread a solution mixed back within. Plotz delivers a water mixture "in the form of shower producing water droplets," clearly not a nozzle suitable for agricultural sprayers. I fail to see how my fog mist nozzle violates any claim cited.

There is a widely sold FOGG-IT "Waterfog" hose-cap nozzle, manufactured by Fogg-It Nozzle Company, P. O. Box 16033, San Francisco, Calif. 94116, under U.S. Pat. No. 2,651,547. This is an excellent fogger manufactured with three miniature nozzles clustered on the front of the nozzle, and is available in two or three sized for very fine to coarser fog of greater density. These serve a great purpose for freshening produce or certain plants, but it cannot be adapted for the use of my "Graviti-Fed-Fog Sprayer", nor does it produce the fog mist necessary. There are no doubt other foggers on the market similar to FOGG-IT which would not be at all suitable for my sprayer, nor would they give water controlled mist for gentle, controlled irrigation.

BRIEF SUMMARY OF THE INVENTION

This invention relates to an improved spray nozzle to be used on a long-handled, rigid conduit sprayer contraption, powered by a common garden hose for easily and effectively spraying nutrients, insecticides or other solutions commonly used in small vegetable gardens, the object being to produce a fog mist comparable to that produced by cumbersome compressed-air tank sprayers or trombone type sprayers. This is to be accomplished by gravity feeding the desired solution into a fog mist of pure water as it emerges from the nozzle through an open ended mixing chamber.

BRIEF DESCRIPTION OF THE SEVERAL VIEWS OF THE DRAWINGS

FIG. 1 A complete overall view of the contraption.
FIG. 2 An upright view of the graduated solution jar, picturing a clear plastic tubing to nozzle.
FIG. 3 Same as FIG. 2, but tilted for operation.
FIG. 4 Nozzle arm switched to opposite side of jar for right hand operation.
FIG. 5 Same as FIG. 4, showing nozzle arm turned downward.
FIG. 6 Enlarged view of complete nozzle.
FIG. 7 Enlarged view of diaphragm.

DETAILED DESCRIPTION

In FIG. 1 the three-foot handle 11 is rigid conduit, made of ¾" schedule 40 plastic pipe (PVC) or any lightweight, rigid material. It serves as a water conduit from a garden hose adapter 14, up to and including a cross section of conduit 18 with matched lengths on each side of handle 11. The ends of the cross have short, matched right and left angles, respectively, with matched, threaded outlets to accomodate a plug 19 at one end and the nozzle arm assembly 21-22-23 at the other end. In changing from left hand operation to right hand, all that is necessary is to swap places with plug 19 on opposite side and nozzle arm assembly 21-22-23; also switch sides with plastic tubing 24. An ordinary wide-mouth, graduated quart glass jar 17 screws into jar cap 16 on the extended end of handle 11. Water is blocked off from this extended handle. The complete contraption 10 is tilted for spraying by using short control arm 13 near garden hose end.

FIG. 2 pictures jar 17 partly filled with solution being fed by gravity into the fog mist as it emerges from nozzle 23. This is accomplished by tilting the contraption by means of short handle 13 permitting solution to flow from jar 17 through nipple 26/27, through transparent hose 24, thence nozzle nipple 31 extending through wall of mixing chamber to depression 32 in bottom of mixing chamber at front end of nozzzle 23 in FIG. 6. With cut-off valve 22 open fog-mist emerges nozzle hole picking up and combining incoming fluid as it overflows depression 32. This spray mist continues unobstructed through open end mixing chamber as a strong fog-mist mixed spray, FIG. 4.

On each side of jar cap 16 nipples 26 and 27 are provided. One nipple is utilized for plastic tubing 24, the other as a wide open air vent. The other end of the tubings 24 is attached to nozzle nipple 31. Water cut-off valve 22 is close to nozzle 23 for quick water shut off.

The second nipple 26/27 on jar cap, in addition to being used as a vent, affords the nozzle arm 21-22-23 to be switched to opposite side of jar in order to make sprayer for right-hand or left-hand operation by means of matched cross arm 18.

The enlarged sectional view of nozzle 23, FIG. 6, shows nozzle 23 attached to cut-off valve 22, with end of cut-off valve 22 against first hose washer 27. Diaphragm 29 fits between the two washers 27.

FIG. 7 shows a blown-up view of diaphragm 29 illustrating how three 1/16" holes 30 are drilled at 45° angle, pointed parallel with center of disc in a direction slightly above next slanted aperture ahead. These holes are evenly spaced around the diaphragm near inside of hose washers 27. When in operation the resulting swirl between the first washer and inside bottom of nozzle 23 creats the fog-mist as the water is forced through the 1/16" nozzle hole. For feeding this fog-mist with spray solution from jar 17, as already described, a small open-end mixing chamber $\frac{3}{8}$inches long with $\frac{5}{8}$inch inside diameter is provided, becoming the front part of nozzle 23. In the bottom of this chamber next to and encircling the nozzle hole is a wide depression 32, leaving the nozzle hole standing on a tiny island. Nozzle nipple 31 extends through the wall of the mixing chamber, thence to middle of depression 32. This arrangement permits incoming solution to flow around island and build up to overflowing where it is caught up in the emerging fog-mist, thereby becoming part of the fog-mist spray. With the $\frac{3}{8}$" mixing chamber the fog-mist-spray does not become wide enough to touch inside wall of mixing chamber, but continues undestrubed as strong fog-mist spray.

MODE OF OPERATION

There is but one rate of flow of solution from jar 17 to nozzle 23 through tubing 24 and the two I.D. $\frac{1}{8}$" nipples 26 and 31, which delivers one quart of solution each seven minutes. With 1/16" nozzle hole clear water mist flows at rate of fifteen quarts each seven minutes, which together with the incoming one quart of solution, make a total of sixteen quarts, or four gallons.

To charge jar 17 to produce the four gallons of finished spray, simply put in jar 17 the quantity of concentrated spray material directed by manufacturer for four gallons of mixed spray. Fill quart jar 17 with water and agitate as you spray.

With water hose connected to sprayer and supply spigot open, and cut-off valve 22 closed, operation can begin.

Open cut-off valve 22 to start plain fog-mist. With short handle 13 tilt jar 17 and watch for solution to begin flowing. Spray with a small, circular or up-and-down motion for two important reasons: (1) a good coverage is assured, and (2) the solution is kept well agitated. The garden hose should maintain an even pressure. Nothing to clean up, except jar 17, tubing 24 and mixing chamber in front of nozzle 23. Use different jars for toxic material.

For an idea, or example, of how the apparatus can be made with plastic pipe for a working model, see my first application, Ser. No. 096,748, filed Nov. 23, 1979, now abandonded.

I claim as my invention:

1. An agricultural spraying apparatus comprising:

coupling means for connecting the apparatus to a source of water;

a container for spray liquid concentrate;

a cap with means to receive said container;

a first nipple secured to said cap;

a hose coupled to said first nipple;

a nozzle means, said nozzle means including (a) a second nipple to which said hose is connected; (b) a screw-threaded end; (c) a diaphragm located downstream of said screw-threaded end and having a plurality of inclined passages for producing a swirling flow of water, (d) a transverse wall downstream of said diaphragm, said wall having a centrally located hole for the passage of said swirling flow of water, and (e) a shallow depression on a downstream end of said wall, said depression surrounding said hole, said nipple extending to said depression so as to feed by gravity the concentrate from the container to said depression whereby as water flows through said hole in the form of a mist it picks up and carries the concentrate out of said nozzle means; a valve upstream of the nozzle means for controlling the flow of water to said nozzle means; support means for supporting said container and nozzle means that includes (a) said coupling means, (b) an elongate tubular conduit extending from said coupling means, (c) a short handle extending laterally away and in opposite directions from said elongated tubular conduit near the downstream end there-of and, (d) two short extensions extending laterally away and in opposite direction from said elongated tubular conduit near the downstream end there-of and, (e) each said short extension receiving a 45° elbow at its downstream end, each said 45° elbow having screwthreads which cooperate with the screwthreads of the nozzle means to secure same to the support means, the portion said elongated tubular conduit extending downstream of said short extension terminating in said cap, said elongated tubular conduit, said short extensions, and said 45° elbows being hollow so as to allow the flow of water from the coupling means to said nozzle means, and plug means for closing off the 45° elbow not having the nozzle means.

* * * * *